Aug. 15, 1939    R. E. SALVESEN    2,169,501
DISPENSING CAP
Filed July 10, 1937

Inventor
Richard E. Salvesen

Patented Aug. 15, 1939

2,169,501

UNITED STATES PATENT OFFICE 2,169,501

DISPENSING CAP

Richard E. Salvesen, Forest City, Iowa

Application July 10, 1937, Serial No. 152,943

5 Claims. (Cl. 91—67.5)

This invention relates to dispensing caps or other means for closing the delivery end of containers of the type such as is adapted for the dispensation of liquids such as mucilage, or the extrusion of heavier material such as tooth paste or shaving cream.

The object of my invention is to provide a simple means for closing the delivery end of a container employing a spreader device in connection therewith, wherein the fluid within the container may be automatically delivered to the surface being treated at a point in front of the spreader, the delivery being controlled by action of the spreader when in use.

More particularly, it is the object of my invention to provide modifications of the dispensing cap disclosed in my co-pending application filed March 8, 1937, Serial No. 129,632. In the said co-pending application the dispensing cap consisted primarily of a detachable cap having a delivery opening in one end and a tubular spreader element closing said opening wherein lateral movement of the free end of the spreader element would cause the flexible and tubular member to partially collapse so as to permit a delivery opening to be established between a portion of the spreader and the adjoining side of the opening through which the spreader element extends. The present invention simply discloses various means and methods whereby an opening will be formed for discharging the material on movement of the spreader element relative to the container supporting the same.

My invention consists in the construction, arrangement and combination of the various parts of the device, whereby the objects contemplated are attained, as hereinafter more fully set forth, pointed out in my claims, and illustrated in the accompanying drawing, in which:

Figures 1, 2:
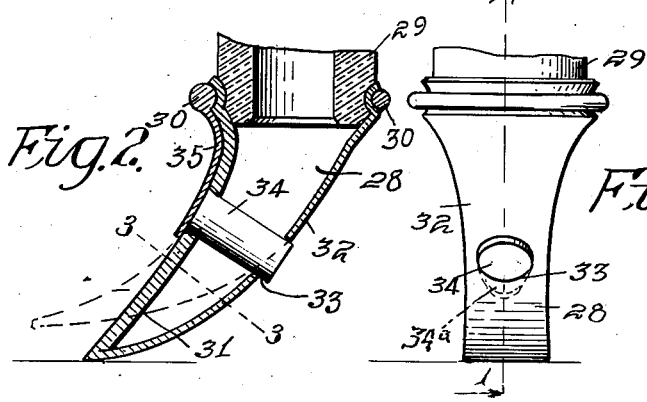
Figure 1 is a front elevation of a hollow and flexible spreader having the delivery opening in one of its sides instead of in its end.
Figure 2 is a detail sectional view taken on the line 2—2 of Figure 1.
Figure 3:
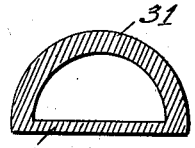
Figure 3 is a sectional view taken on the line 3—3 of Figure 2.

In Figures 1 and 2 I have illustrated a spreader element 28 formed of flexible material such as rubber, having one end adapted to be placed over the outer end of a container 29 and secured thereto by means of any suitable fastening device 30, the top wall 31 of the spreader 28 being preferably semi-circular, as illustrated in Figure 3, and the under surface 32 being preferably flat and of thinner material and provided with an outlet opening 33, said opening being designed to receive a pin 34 which is of such diameter as to close the said opening and having one end provided with a stiff and rigid support 35, which is preferably carried by the element 30. By this arrangement fluid from within the container 29 will flow to the interior of the spreader 32 and will be retained therein until the lower end of the spreader is applied to the surface and bent to the dotted line position, illustrated in Figure 2. On account of the wall 31 being stationary and thicker than the wall 32, the wall 32 will be stretched, and with it the opening 33 so that the said opening will be elongated so as to provide an opening 34a between the lower side of the member 33 and the adjacent side of the opening 33 through which material may be discharged to the surface 36, thus providing means whereby the flow of material may be automatically controlled by increasing or decreasing the pressure applied to the spreader element. By this arrangement it will be seen that instead of the pin that closes the discharge opening being contracted or compressed, the size of the opening itself is increased or elongated in a reverse operation from that previously described.

Figure 4:
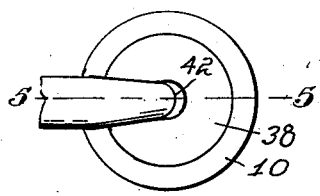
Figure 4 is a plan view of a modified form of a dispensing device in which the delivery end of the device is provided with a thin rubber diaphragm having a comparatively stiff spreader element extending through the diaphragm.
Figure 5:
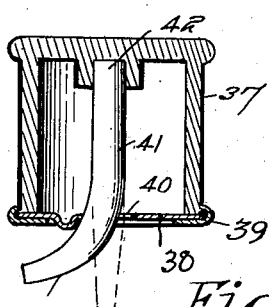
Figure 5 is a sectional view taken on the line 5—5 of Figure 4.

In Figure 5 I have illustrated another form which is operated substantially on the same principle as that illustrated in Figures 1 and 2, in which the end of the container 37 is provided with a rubber diaphragm 38 having means 39 for securing it to the end of the container, said diaphragm being provided with a discharge opening 40 through which is inserted the spreader 41, the upper end of the member 41 being fixed to the contained in any desired manner as at 42, while its free end extends outwardly from the diaphragm 38. It will readily be seen that as the outer end of the member 40 is moved laterally an elongated opening will be formed in the diaphragm, as illustrated in Figure 4, thus providing means whereby the fluid may be automatically applied to the spreader.

Both of these forms reside in simply imparting lateral movement to the spreader for automatically controlling the flow of the fluid. It is my desire to protect this broad idea rather than any particular specific construction for carrying out this idea.

It will readily be seen that the dispensing cap may be used in connection with the dispensing of powders as well as fluids or semi-fluids, if so desired, by simply forming the spreader opening an dthe spreader in the most desired shape or and the spreader in the most desired shape or size.

I claim as my invention:

1. The combination of a container having one end open, a comparatively thin and flexible element across the open end of said container, said flexible element having a discharge opening and means projecting through said opening to close the same, having one end fixed to said container and the other susceptible to movement and projecting therefrom, whereby relative movement between the free end of the said closing means and the flexible element will elongate said opening to permit material from within said container to flow outwardly through one end of said elongated opening.

2. The combination of a container and a flexible member closing the open end of said container and having a discharge opening, and a fixed element projecting through and closing said opening, whereby stretching the flexible element in one direction will cause an elongated and enlarged opening to be formed at one side of said fixed element to permit material within said container to flow therefrom.

3. A container, a hollow and flexible spreader closing one end of said container, the outer end of said spreader being closed, said spreader having an opening in one side, and a closing element having one end fixed to support the element against lateral movement, with the other end projecting through said opening whereby lateral movement of the free end of said spreader will stretch and elongate said opening to permit material within said container and said spreader to flow through a portion of said elongated opening to the outer surface of said spreader.

4. The combination of a container having one end open, a comparatively thin and flexible element stretched across the open end of said container, said flexible element having a discharge opening, and means projecting through said opening to close the same whereby relative movement between the closing means and the flexible element closing the container will elongate the discharge opening to permit material within the container to flow outwardly therefrom.

5. A spreader, comprising a substantially flexible and tapering casing having a wall semi-circular in cross section and open at one end and one side, the open end being provided with rigid means for retaining the spreader on the open end of a container, a plate fixed to said rigid means, a thin and flexible element connecting the edges of said semi-circular wall and having a discharge opening, a rigid closing means projecting through said opening and fixed to said plate whereby lateral movement of the free end of said spreader will stretch and elongate said opening to permit material within said container and said spreader to flow through a portion of said elongated opening to the outer surface of said spreader.

RICHARD E. SALVESEN.